United States Patent
Mike et al.

(10) Patent No.: US 10,766,383 B2
(45) Date of Patent: Sep. 8, 2020

(54) VEHICLE SEAT

(71) Applicant: TACHI-S CO., LTD., Akishima-shi, Tokyo (JP)

(72) Inventors: Masahiko Mike, Akishima (JP); Yudai Shouji, Akishima (JP)

(73) Assignee: TACHI-S CO., LTD., Tokyo (JP)

( * ) Notice: Subject to any disclaimer, the term of this patent is extended or adjusted under 35 U.S.C. 154(b) by 0 days.

(21) Appl. No.: 16/306,576

(22) PCT Filed: Jun. 5, 2017

(86) PCT No.: PCT/JP2017/020772
§ 371 (c)(1),
(2) Date: Dec. 2, 2018

(87) PCT Pub. No.: WO2018/020836
PCT Pub. Date: Feb. 1, 2018

(65) Prior Publication Data
US 2019/0291609 A1    Sep. 26, 2019

(30) Foreign Application Priority Data
Jul. 28, 2016 (JP) ................. 2016-148709

(51) Int. Cl.
B60N 2/06 (2006.01)
B60N 2/12 (2006.01)
(Continued)

(52) U.S. Cl.
CPC ............. B60N 2/1615 (2013.01); B60N 2/06 (2013.01); B60N 2/16 (2013.01); B60N 2/168 (2013.01)

(58) Field of Classification Search
CPC .......... B60N 2/06; B60N 2/16; B60N 2/1615; B60N 2/168; Y10T 403/32951; Y10T 403/32959; Y10T 403/75
(Continued)

(56) References Cited

U.S. PATENT DOCUMENTS 2,964,341 A * 12/1960 Doyle ................. F16G 13/00
                                                                      403/162
5,033,900 A *  7/1991 Pine .................... F16B 5/04
                                                                      403/146
(Continued)

FOREIGN PATENT DOCUMENTS

DE         4030855 A1 * 4/1992 ............ F16C 11/04
JP     2001-278008 A    10/2001
(Continued)

OTHER PUBLICATIONS

International Search Report from International Patent Application No. PCT/JP2017/020772, dated Aug. 15, 2017.

*Primary Examiner* — Rodney B White
(74) *Attorney, Agent, or Firm* — SGPatents PLLC

(57) ABSTRACT

A vehicle seat includes a lifter device lifting/lowering a seat cushion. The lifter device includes a link member coupling a side frame and a riser to each other, and a clinching pin coupling the riser or the side frame and the link member to each other. The clinching pin includes a first portion located on the opposite side of the link member from the riser, a second portion located in a position corresponding to a hole of the link member, a third portion located in a position corresponding to a hole of the riser, and a fourth portion that is located on the opposite side of the riser from the link member. A surface of the second portion facing the riser has a portion adjacent to the third portion, and the portion is away from a surface of the riser facing the second portion.

7 Claims, 8 Drawing Sheets

(51) Int. Cl.
*B60N 2/16* (2006.01)
*B60N 2/18* (2006.01)
*B60N 2/68* (2006.01)

(58) Field of Classification Search
USPC .................. 297/344.15, 344.16, 344.17
See application file for complete search history.

(56) References Cited

U.S. PATENT DOCUMENTS

| | | | | |
|---|---|---|---|---|
| 5,082,387 | A * | 1/1992 | DeVries | F16B 39/24 403/146 |
| 6,347,778 | B1 * | 2/2002 | Koga | B60N 2/1615 297/344.17 X |
| 6,357,955 | B1 * | 3/2002 | Hoffmann | F16D 1/12 403/150 |
| 6,805,408 | B2 * | 10/2004 | Buhl | B60N 2/0296 297/344.15 X |
| 7,278,686 | B2 * | 10/2007 | Yoshida | B60N 2/1615 297/344.15 X |
| 7,316,454 | B2 * | 1/2008 | Yoshida | B60N 2/1615 297/344.15 X |
| 7,513,571 | B2 * | 4/2009 | Hofmann | B60N 2/002 297/344.15 X |
| 7,571,886 | B2 * | 8/2009 | Carter | B60N 2/502 297/344.15 X |
| 8,172,326 | B2 * | 5/2012 | Adragna | B60N 2/1615 297/344.15 |
| 8,382,205 | B2 * | 2/2013 | Teer | B60N 2/929 297/344.17 |
| 8,622,363 | B2 * | 1/2014 | Ellerich | B60N 2/502 297/344.15 X |
| 9,126,518 | B2 * | 9/2015 | Adragna | B60N 2/1615 |
| 2006/0099050 | A1 * | 5/2006 | Maloney | F16B 19/06 411/500 |
| 2007/0274616 | A1 * | 11/2007 | Schrimpl | B60N 2/06 384/34 |
| 2009/0218868 | A1 * | 9/2009 | Koga | B60N 2/1839 297/344.17 |
| 2012/0261963 | A1 * | 10/2012 | Heyer | B60N 2/0232 297/313 |
| 2014/0224553 | A1 * | 8/2014 | Ozawa | B60N 2/002 177/136 |
| 2015/0097404 | A1 * | 4/2015 | Furuta | B60N 2/68 297/344.15 |
| 2017/0028890 | A1 * | 2/2017 | Matsui | B60N 2/1864 |
| 2017/0101033 | A1 * | 4/2017 | Ferenc | B60N 2/682 |
| 2017/0120778 | A1 * | 5/2017 | Suzuki | B60N 2/1635 |
| 2017/0210253 | A1 * | 7/2017 | Hirano | B60N 2/16 |
| 2017/0291508 | A1 * | 10/2017 | Yadav | B60N 2/90 |
| 2018/0079326 | A1 * | 3/2018 | Hayashi | B60N 2/0232 |
| 2018/0194249 | A1 * | 7/2018 | Schueler | B60N 2/1615 |
| 2018/0208093 | A1 * | 7/2018 | Fukuda | B60N 2/1615 |
| 2019/0135138 | A1 * | 5/2019 | Duhamel | B60N 2/1615 |

FOREIGN PATENT DOCUMENTS

| | | |
|---|---|---|
| JP | 2006-298086 A | 11/2006 |
| JP | 2009-154638 A | 7/2009 |
| JP | 2014-083905 A | 5/2014 |

* cited by examiner

VEHICLE SEAT

TECHNICAL FIELD

The present discloser relates to vehicle seats, and is applicable to, for example, a vehicle seat including a lifter mechanism to move a seat cushion up/down.

BACKGROUND ART

Some vehicle seats include a height device (lifter device) that couples a seat cushion, which is a seating portion of a seat body, to the body floor in a liftable/lowerable manner. The height device is generally installed between a side frame of the seat cushion and a fitting bracket which is placed to a slide rail on the body floor, and the height device includes a pair of front links located on the front side of the seat, and a pair of rear links located on the rear side of the seat, in which one of the rear links serves as a drive link to provide the configuration capable of adjusting the height of the seat body.

CITATION LIST

Patent Literature

PTL 1: Japanese Patent Application Laid-Open No. 2006-298086

SUMMARY OF INVENTION

Technical Problem

For example, the front links and the rear links (which are collectively called "a lifter link") are coupled to the fitting brackets by clinching pins. Backlash can sometimes occur in the clinching process due to variations in components.

An aspect of the present disclosure is to provide a vehicle seat with less backlash in the lifter link.

Other aspects and novel features will be apparent from the following description of the specification and the accompanying drawings.

Solution to Problem

A brief overview of representative aspects of the disclosure will be described as follows:

Specifically, a vehicle seat includes: a seat cushion; and a lifter device that moves the seat cushion up/down. The lifter device includes: a side frame fixed to the seat cushion; a riser; a link member that couples the side frame and the riser to each other; and a clinching pin that couples the riser or the side frame and the link member to each other. The link member includes: a hole; and a metal bush that covers an end of the hole and both faces of the link member. The clinching pin includes: a first portion located on the opposite side of the link member from the riser; a second portion located in a position corresponding to the hole of the link member; a third portion located in a position corresponding to a hole of the riser; and a fourth portion located on the opposite side of the riser from the link member. The first portion has a diameter greater than a diameter of the second portion and greater than an internal diameter of the metal bush. The second portion has a diameter greater than a diameter of the third portion and smaller than the internal diameter of the metal bush. The third portion has a diameter smaller than a diameter of the hole of the riser. The fourth portion has a diameter greater than the diameter of the third portion and greater than the diameter of the hole of riser. The second portion has a surface facing the riser and the surface has a portion adjacent to the third portion, and the portion is located away from a surface of the riser facing the second portion.

Advantageous Effects of Invention

With the foregoing vehicle seat, a reduction in backlash in the lifter link section is enabled.

DESCRIPTION OF EMBODIMENTS

Figure 1:
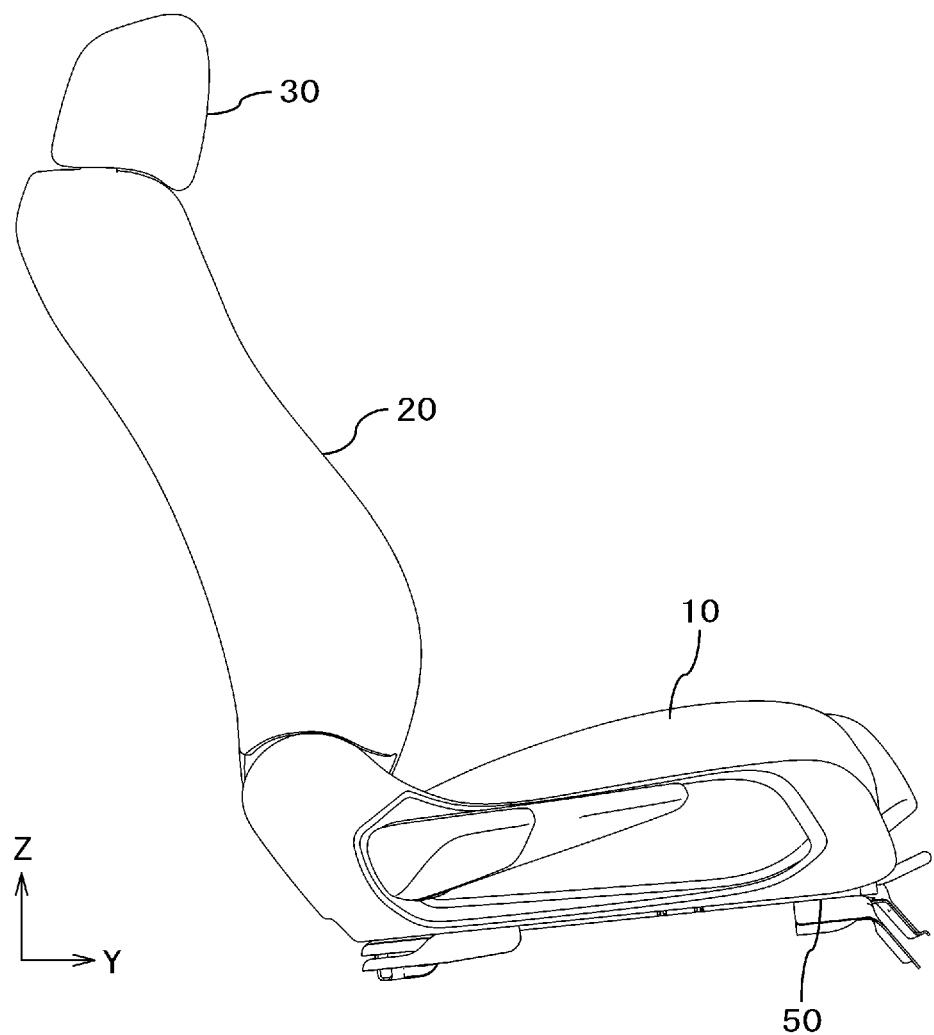
FIG. 1 is a side view of a vehicle seat according to an example.

Embodiments and modifications will now be described with reference to the accompanying drawings, wherein throughout the following description, like reference signs are used to refer to like elements and sometimes a description thereof is omitted. It should be noted that, for the purpose of clarity, sometimes, the figures show schematic representation of the width, thickness, shape and the like for each portion as compared with those in actual aspect, which are intended to be illustrative of the invention without limiting the understanding thereof. It should be noted that, for directions referred herein, such as a front-rear/longitudinal direction, an up-down/vertical direction, a left-right/lateral direction, and the like, the Y-axis direction as shown in FIG. 1 is defined as the front direction, the X-axis direction is defined as the right direction and the Z-axis direction is defined as the up direction.

EXAMPLES

First, the structure of a vehicle seat according to an example will be described with reference to FIG. 1. FIG. 1 is a side view illustrating the vehicle seat according to an example.

The vehicle seat 1 according to the example includes: a liftable/lowerable seat cushion 10; a seatback 20 inclinable with respect to the seat cushion 10; and a headrest 30 connected to the seatback 20. The vehicle seat 1 further comprises a slide adjuster 50 that adjusts a front-rear position of the seat cushion 10, and a lifter device that moves up/down the seat cushion 10 for height adjustment.

Figure 2:
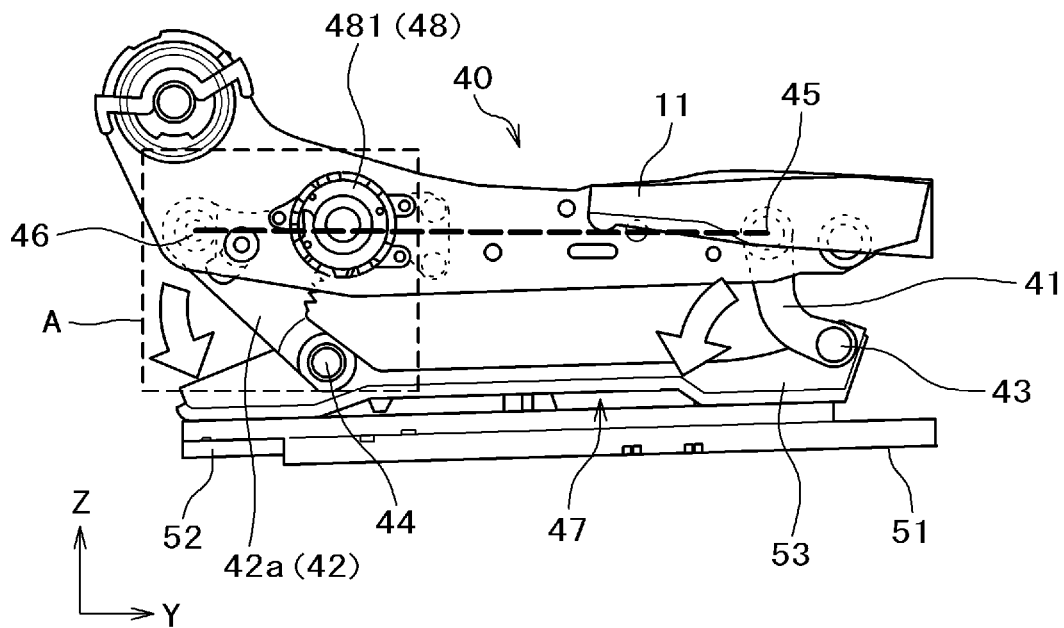
FIG. 2 is a side view of a lifter device in FIG. 1.
Figure 3:
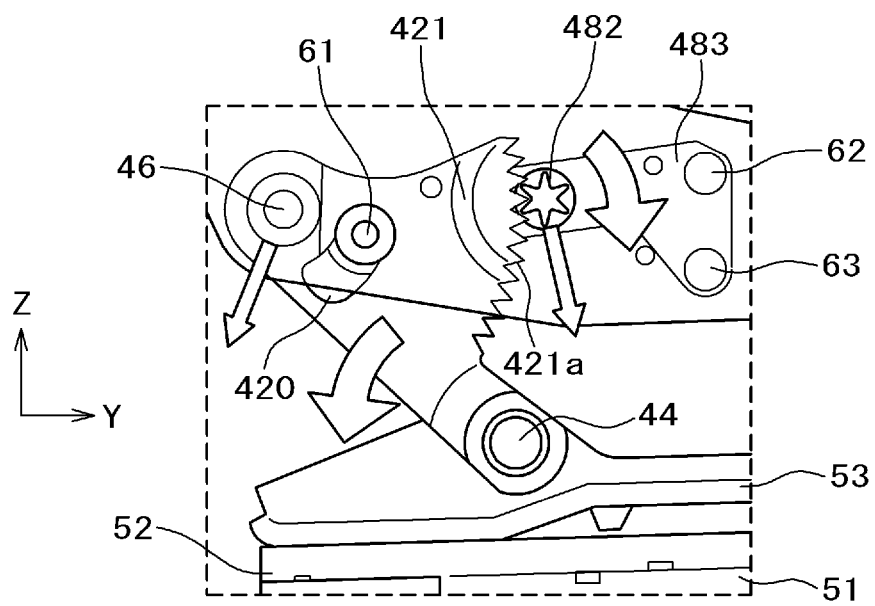
FIG. 3 is an enlarged view of FIG. 2.
Figure 4:
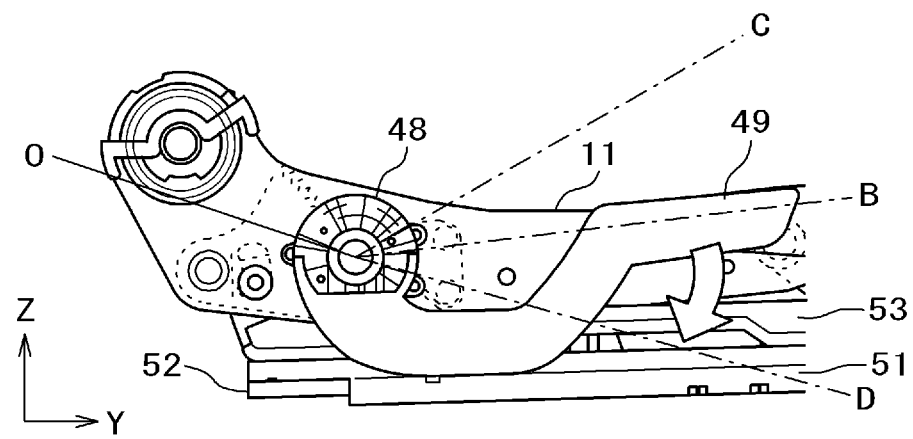
FIG. 4 is a side view illustrating an operating lever of the lifter device.
Figure 5:
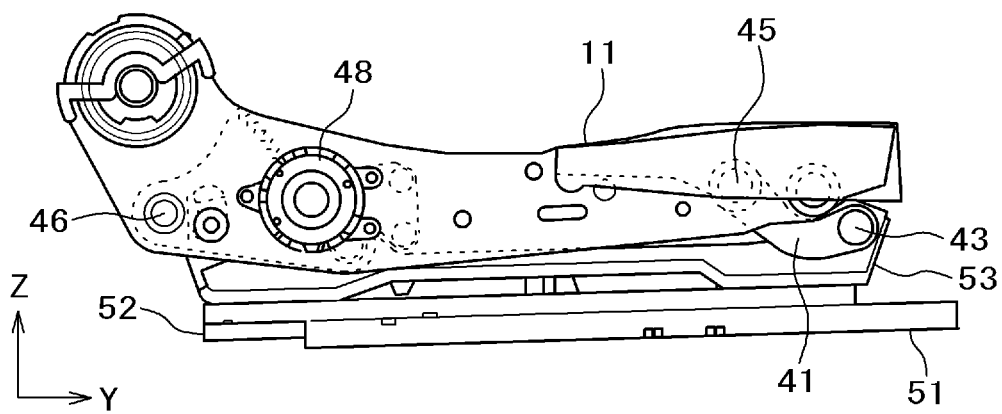
FIG. 5 is a side view of the lifter device.

The lifter device will be described below with reference to FIG. 2 to FIG. 5. FIG. 2 is a side view of the lifer device when viewed from outside, the view showing the lifter device moved to a higher position. FIG. 3 is an enlarged view of area A shown by the dotted line of FIG. 2. FIG. 4 is side view of an operating lever. FIG. 5 is a side view of the lifter device when viewed from outside, the view showing the lifter device moved to a lower position.

The slide adjuster 50 includes lower rails 51 fixed to the floor of the vehicle body, and upper rails 52 mounted on the underside of the seat cushion 10. The upper rails 52 are secured to risers 53 placed in a lower portion of the seat cushion 10.

As shown in FIG. 2, the lifter device 40 includes: a pair of side frames 11 that are fixed to the left and right (outer side and inner side) of the seat cushion 10; and a pair of left and right front link members (front links) 41 and a pair of left and right rear link members (rear links) 42 which are all coupled to the pair of risers 53 fixed to the slide adjuster 50.

Lower ends of the pairs of left and right front link members 41 and left and right rear link member 42 are rotatably coupled respectively to the fronts and rears of the pair of risers (fitting brackets) 53 through clinching pins 43, 44. Upper ends of the pair of front link members 41 are rotatably coupled to front portions of the pair of side frames 11 through clinching pins 45. Upper ends of the pair of left and right rear link members 42 are rotatably coupled to rear portions of the pair of side frames 11 through clinching pins 46.

One of the rear link members 42 forms a drive link member (42a) provided integrally with a sector gear 421 configured as described later. The other rear link member 42 forms a driven link member (not shown) driven via a rod (not shown). The front link members 41, the rear link members 42, the side frames 11 and the risers 53, which are described above, constitute a parallel link mechanism 47. The rotation of one (the drive link member 42a) of the rear link members 42, having the sector gear 421 integrally provided, is transferred to the driven link member via the rod, so that the parallel link mechanism 47 is actuated to cause the side frame 11 to move parallel in the up-down direction.

As shown in FIG. 4, a brake device 48 is installed in the side frame 11, and the operating lever 49 is coupled to the brake device 48. As shown in FIG. 3, the brake device 48 is fixed to the side frame 11 and is installed with a pinion gear 482 capable of being rotated by operation of the operating lever 49. The above-described one rear link member 42 (the drive link member 42a) is provided integrally with the sector gear 421, and the sector gear 421 has teeth 421a formed at the distal end thereon, the teeth 421a having an arc shape centered at the clinching pin 46. The pinion gear 482 of the brake device 48 meshes with the teeth 421a.

Thus, the sector gear 421 is rotated by the rotation of the pinion gear 482, and in turn the drive link member 42a is rotated by the rotation of the sector gear 421, so that the above-described parallel link mechanism 47 moves the side frames 11 up/down to an appropriate height position.

In FIG. 3, the sector gear 421 has a long hole 420 formed therein and having an arc shape centered at the clinching pin 46. An end of a stopper pin 61 loosely fitted into the long hole 420 passes through the side frame 11 and is fastened to the side frame 11 so that the stopper pin 61 restricts the rotating range of the sector gear 421. The other end of the stopper pin 61 is fastened to a holding bracket 483. The holding bracket 483 is integrally coupled to the side frame 11 at two points on the opposite side of the pinion gear 482 from the stopper pin 61, by use of coupling pins 62, 63 passing through the side frame 11.

Note that the brake device 48 includes a first mechanism and a second mechanism. The first mechanism transfers, to the pinion gear 482, the input of the positive rotation or negative rotation caused by the operating lever 49. The second mechanism restricts the rotation of the pinion gear 482 after the operation of the operating lever 49.

The operation of the lifter device will now be described. In the state illustrated in FIG. 5, the operating lever 49 is operated in the direction that moves up the seat cushion 10 (upper position C) (repeatedly operated with a ratchet mechanism), whereupon the pinion gear 482 is rotated in one direction by the brake device 48. Thus, the sector gear 421 meshing with the pinion gear 482, together with the drive link member 42a, rotates about the clinching pin 46 in the clockwise direction in FIG. 3, and the drive link member 42a rotates about the clinching pin 44 in the clockwise direction. The actuation of the drive link member 42a about the clinching pin 44 as a pivot is transferred to the driven link member through the rod. Then, by the parallel mechanism 47 in which the front link member 41 is pulled by the side frames 11 coupled to the drive link member 42a, the seat cushion 10, together with the side frames 11, is moved up. The state shown in FIG. 2 is reached. The amount of lift of the seat cushion 10, that is, the degree of rotation of the sector gear 421, is restricted by engagement of one end of the arc-shaped long hole 420 of the sector gear 421 with the stopper pin 61.

Upon release of the operating lever 49, due to the load of the weight of the vehicle seat 1 and the weight of the seated person, the pinion gear 482 attempts to rotate in the direction opposite to the above-described direction, but the rotation of the pinion gear 482 is stopped by the second mechanism of the brake device 48. Note that the operating lever 49 is returned to an original position (neutral position) B by the biasing force of a spring (not shown).

In the state illustrated in FIG. 5, where the operating lever 49 is operated in the direction that moves down the seat cushion 10 (lower position D) (repeatedly operated with the ratchet mechanism), the pinion gear 482 is rotated in the direction opposite to the aforementioned direction by the brake device 48, so that the sector gear 421 meshing with the pinion gear 482 rotates about the clinching pin 46 in the counterclockwise direction in FIG. 3, and the drive link member 42a rotates about the clinching pin 44 in the counterclockwise direction. The actuation of the drive link member 42a about the clinching pin 44, the seat cushion 10, together with the side frames 11, is moved down by the parallel mechanism 47 in which the front link member 41 is pulled by the side frames 11 coupled to the drive link member 42a. In this case, the degree of rotation of the sector gear 421 (the amount of lift of the seat cushion 10) is also restricted by engagement of the other end of the arc-shaped long hole 420 of the sector gear 421 with the stopper pin 61.

Figure 6:
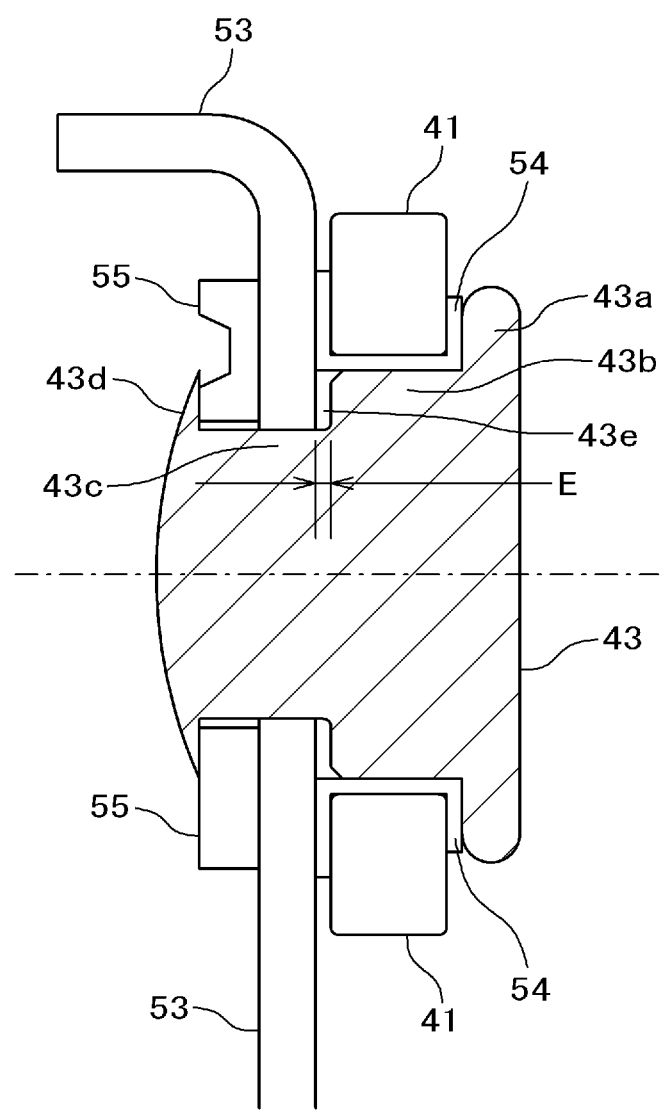
FIG. 6 is a sectional view illustrating the connection structure between a riser and a link member according to an example.

The connection structure (link clinching section) between a linked member (e.g., the riser) and a link member will now be described with reference to FIG. 6. FIG. 6 is a sectional view illustrating the connection structure between the riser and the link member according to an example. Although FIG. 6 illustrates the connection structure between the riser and the front link, the same holds true for the connection structure between the riser and the rear link member, the connection structure between the side frame and the front link member and the connection structure between the side frame and the rear link member.

A hole of the front link member 41 on which a metal bush 54 is fitted, a hole of the riser 53, and a hole of a washer 55 are aligned in this order, then the clinching pin 43 is inserted into the holes from the front link member 41, and then the clinching pin 43 is clinched on the riser 53. The hole of the front link member 41 and the hole of the metal bush 54 have a diameter greater than the diameter of the hole of the riser 53 and the diameter of the hole of the washer 55. The diameter of the hole of the riser 53 is smaller than the diameter of the hole of the washer 55. Therefore, the clinching pin 43 is a step pin, which has a first portion 43a having a largest diameter and located outward of the front link member 41; a second portion 43b having a second largest diameter and located in a position corresponding to the hole of the front link member 41; and a third portion 43c having a smallest diameter and located in a position corresponding to the hole of the riser 53. A fourth portion 43d located outside of the washer 55 after the clinching process has a diameter larger than the diameter of the hole of the washer 55.

The metal bush 54 attached to the front link member 41 is secured by the riser 53, the first portion 43a of the clinching pin 43, and the second portion 43b of the clinching pin 43. The clinching pin 43 has an interstice 43e between the surface of the riser 53 facing the front link member 41 and the surface of the second portion 43b facing the surface of the riser 53. In other words, the length of the second portion 43b in the X direction is "E" shorter than the length of the metal bush 54 in the X direction. The length of the third portion 43c in the X direction is longer than the total thickness of the riser 53 and the washer 55. A distance (E) of the interstice 43e has preferably a nominal value of 0.5 mm, a minimum value of 0.2 mm.

Figure 7:
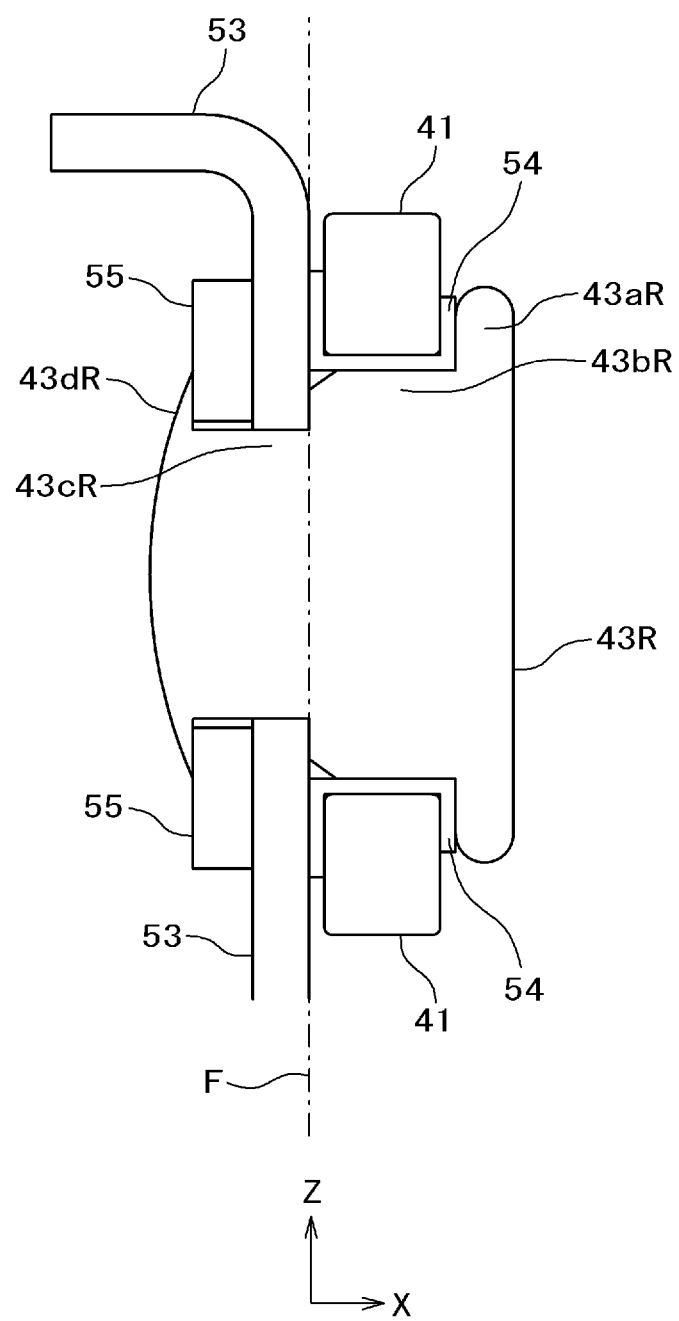
FIG. 7 is a sectional view illustrating the connection structure between a riser and a link member according to a comparison.
Figure 8:
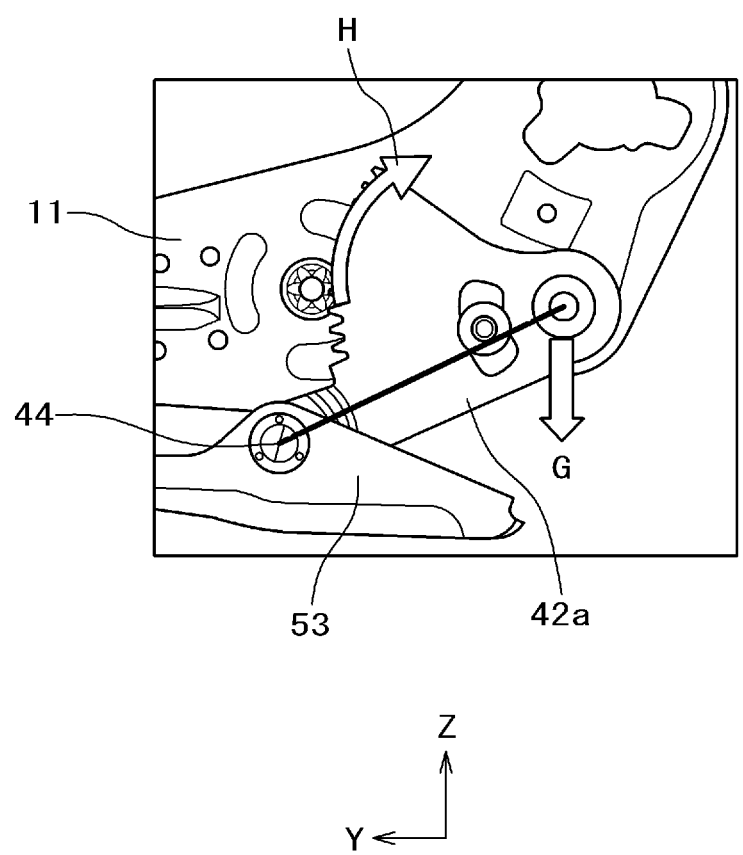
FIG. 8 is a side view for explaining back torque of a brake device.
Figure 9:
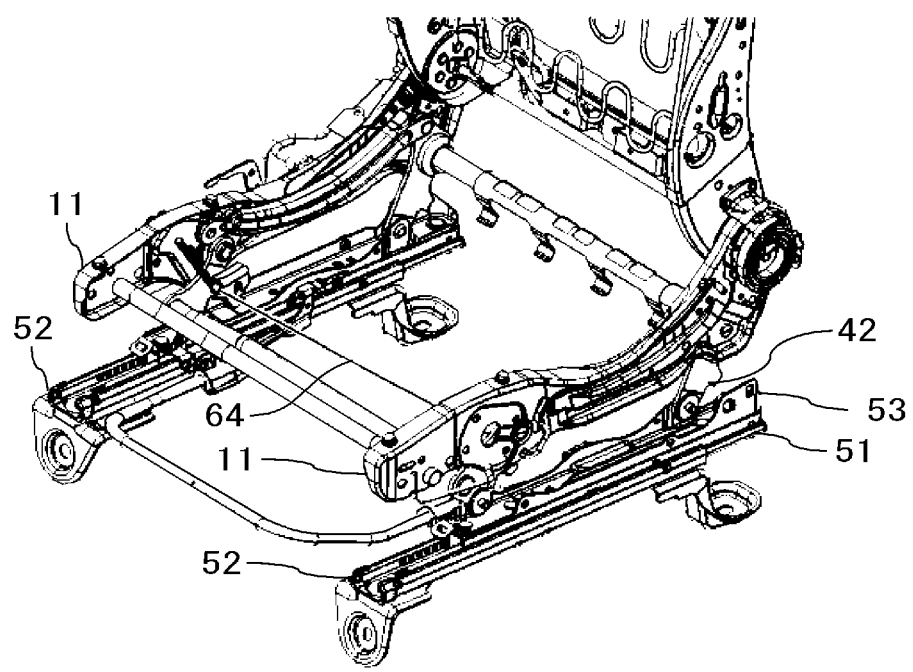
FIG. 9 is a perspective view illustrating a lifter device including an auxiliary spring.
Figure 10:
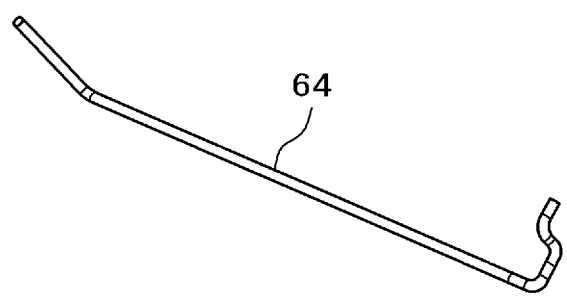
FIG. 10 is a perspective view of the auxiliary spring.
Figure 11:
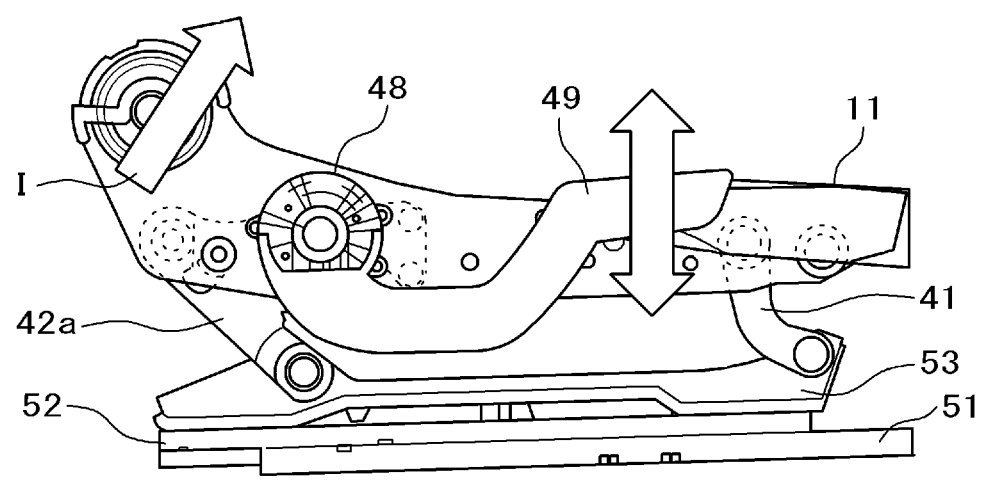
FIG. 11 is a side view for explaining issues relating to a lifter device including an auxiliary spring.

Advantageous effects of the link clinching section according to the example will now be described with reference to FIG. 7 to FIG. 10. FIG. 7 is a sectional view illustrating the connection structure between a riser and a link according to a comparison. FIG. 8 is a side view for explaining back torque of the brake device. FIG. 9 is a perspective view illustrating the lifter device including an auxiliary spring. FIG. 10 is a perspective view of the auxiliary spring. FIG. 11 is a side view for explaining issues of a lifter device including an auxiliary spring.

As illustrated in FIG. 7, the comparison is similar to the example except for the clinching pin, in which there is little interstice between the surface of the riser 53 facing the front link member 41 and the surface of the second portion 43b facing the corresponding surface. For example, when, due to variations, the length (thickness) of the metal bush 54 of the front link member 41 in the X-axis direction is shorter than the length of a second portion 43bR in the X-axis direction, a first portion 43aR of a clinching pin 43R cannot be pressed toward the riser 53 in the clinching process. Because of this, the riser 53 and the first portion 43aR of the clinching pin 43R cannot be used to secure the metal bush 54 of the front link member 41, causing backlash. Occurrence of backlash gives rise to a reduction in sliding friction, causing poor operational sense, and a reduction in operation force. Dot-dash line F represents a place where sliding friction occurs in the clinching process. A reduction in sliding friction gives rise to the following problems.

As illustrated in FIG. 8, at the time of seating, the input enters in the direction of arrow G, whereupon balance input (back torque) enters the brake device 48. The back torque is reduced by the sliding friction at the link clinching section. However, a reduction in sliding friction makes a reduction in back torque impossible. To avoid this, the structure is adopted as illustrated in FIG. 9, in which an auxiliary spring (SPG) 64 is mounted to a lifter link section so that the spring force acts in the upward direction at all times. As illustrated in FIG. 10, both ends of the auxiliary spring 64 are respectively bent into a hook shape, and the proximity of one of the ends is further bent into a hook shape. In this structure, the auxiliary spring 64 is arranged on the side where the side frame 11 is lifted up, in order to bias rotation of the front link member 41.

However, as illustrated in FIG. 11, where the auxiliary spring 64 is mounted to the lifter link section, the spring force acts in the upward direction (arrow I) at all times. Because of this, backlash in the inter-gear engagement section between the pinion gear 482 and the sector gear 421 causes noise at the seating time, and/or a slip is induced within the brake device 48 due to the structure of applying a rotation force to the second mechanism of the brake device 48 at all times, resulting in a change in a seating position during unoccupied time (non-seating). Also, an increase in weight and a decrease in the mounting work efficiency are affected.

In the example, an interstice is provided between the riser 53 and the second portion 43b of the clinching pin 43 with consideration given to variations between components. Thereby, in the clinching process, at all times, the riser 53 and the metal bush 54 of the front link member 41 abut on each other, and the metal bush 54 of the front link member 41 and the first portion 43a of the clinching pin 43 abut on each other. As a result, the metal bush 54 of the front link member 41 is able to be secured by the riser 53 and the first portion 43a of the clinching pin 43, thus eliminating backlash. Eliminating backlash causes an increase in sliding friction. In short, the operating sense is improved as compared with the comparison, and the operation force is increased.

In the example, the amount of stepping for the clinching pin is optimized to provide an interstice between clinch components. This structure is capable of allowing the link clinching section to have an optimum sliding friction, leading to an increase in practical rigidity in frame, and a reduction in backlash. In other words, the tightening margin for clinching is adjusted to eliminate backlash as well as variations, thereby improving the feeling when the operating lever is operated (operation sense) and also enhancing the practical longitudinal rigidity in frame and reducing the longitudinal backlash.

Further, the accessory components such as the auxiliary spring and the like used in the comparison structure can be omitted, thus achieving a reduced component count, a reduced weight, and work simplification.

Although the invention made by the inventors has been described in detail based on the examples, the invention is not limited to the above examples, and it is apparent that various changes can be made.

For example, the lifter device is installed on the slide adjuster in the above example, but the slide adjuster may be not installed.

REFERENCE SIGNS LIST

1 . . . vehicle seat
10 . . . seat cushion
11 . . . side frame
20 . . . seatback
30 . . . headrest
40 . . . lifter device
41 . . . front link member 42 . . . rear link member
43, 44, 45, 46 . . . clinching pin
47 . . . parallel link mechanism
48 . . . brake device
49 . . . operating lever
50 . . . slide adjuster
51 . . . upper rail
52 . . . lower rail
53 . . . riser
54 . . . metal bush
55 . . . washer

The invention claimed is:

1. A vehicle seat, comprising:
a seat cushion; and
a lifter device that moves the seat cushion up/down,
wherein the lifter device includes:
a side frame fixed to the seat cushion,
a riser for mounting the seat cushion,
a link member that couples the side frame and the riser to each other, and
a clinching pin that couples the riser and the link member to each other,
the link member includes a hole and is provided with a metal bush that covers an inner wall portion of the hole and portion of both faces of the link member,
the clinching pin includes:
a first portion located on an opposite side of the link member from the riser;
a second portion located in a position corresponding to the hole of the link member;
a third portion located in a position corresponding to a hole of the riser; and
a fourth portion located on an opposite side of the riser from the link member,
the first portion has a diameter greater than a diameter of the second portion and greater than an internal diameter of the metal bush,
the second portion has a diameter greater than a diameter of the third portion and smaller than the internal diameter of the metal bush,
the third portion has a diameter smaller than a diameter of the hole of the riser,
the fourth portion has a diameter greater than the diameter of the third portion and greater than the diameter of the hole of the riser, and
the second portion has an axial end surface facing the riser and adjacent to the third portion, the axial and surface being located away from a surface of the riser facing the second portion so as to define an interstice between the axial end surface and the surface of the riser.

2. The vehicle seat according to claim 1,
wherein a maximum length of the second portion is shorter than a thickness of the metal bush.

3. The vehicle seat according to claim 2, further comprising a washer that is located between the opposite side of the riser from the link member and a surface of the fourth portion facing the riser.

4. The vehicle seat according to claim 3,
wherein the third portion has a length longer than a total thickness of the riser and the washer.

5. The vehicle seat according to claim 1,
wherein the link member is one of a front link member and a rear link member, and
the side frame, the riser, the front link member, and the rear link member form a parallel link mechanism.

6. The vehicle seat according to claim 1, further comprising a slide adjuster having an upper rail and a lower rail,
wherein the riser is mounted on the upper rail.

7. The vehicle seat according to claim 1, further comprising a brake device having a pinion gear,
wherein the link member is provided integrally with a sector gear, the sector gear has a leading end portion on which teeth of an arc shape are formed, and the pinion gear meshes with the teeth.

* * * * *